(12) United States Patent
Abraham et al.

(10) Patent No.: US 9,002,352 B2
(45) Date of Patent: Apr. 7, 2015

(54) SYSTEM AND METHOD OF SERVICE DISCOVERY

(71) Applicant: Qualcomm Incorporated, San Diego, CA (US)

(72) Inventors: Santosh Paul Abraham, San Diego, CA (US); George Cherian, San Diego, CA (US); Jouni Malinen, Findland (FI)

( * ) Notice: Subject to any disclaimer, the term of this patent is extended or adjusted under 35 U.S.C. 154(b) by 208 days.

(21) Appl. No.: 13/689,436

(22) Filed: Nov. 29, 2012

(65) Prior Publication Data

US 2013/0281056 A1    Oct. 24, 2013

Related U.S. Application Data

(60) Provisional application No. 61/635,229, filed on Apr. 18, 2012.

(51) Int. Cl.
| | |
|---|---|
| *H04W 4/00* | (2009.01) |
| *H04W 48/16* | (2009.01) |
| *H04W 48/14* | (2009.01) |
| *H04W 84/12* | (2009.01) |

(52) U.S. Cl.
CPC .............. *H04W 48/16* (2013.01); *H04W 48/14* (2013.01); *H04W 84/12* (2013.01)

(58) Field of Classification Search
CPC ..... H04W 8/005; H04W 84/12; H04W 76/02; H04L 67/16
USPC ................................. 455/411, 434
See application file for complete search history.

(56) References Cited

U.S. PATENT DOCUMENTS

| | | | |
|---|---|---|---|
| 7,949,358 B2 | 5/2011 | Wentink et al. | |
| 8,170,481 B2 * | 5/2012 | Rangarajan et al. | 455/41.2 |
| 2007/0243888 A1 * | 10/2007 | Faccin | 455/461 |
| 2008/0298333 A1 | 12/2008 | Seok | |
| 2009/0245133 A1 * | 10/2009 | Gupta et al. | 370/254 |
| 2010/0322213 A1 * | 12/2010 | Liu et al. | 370/338 |
| 2011/0103264 A1 | 5/2011 | Wentink | |
| 2011/0149806 A1 * | 6/2011 | Verma et al. | 370/255 |
| 2012/0076118 A1 | 3/2012 | Montemurro et al. | |
| 2012/0165056 A1 | 6/2012 | Kim et al. | |
| 2012/0218918 A1 | 8/2012 | Takae et al. | |
| 2013/0231151 A1 * | 9/2013 | Kneckt et al. | 455/515 |
| 2013/0316705 A1 * | 11/2013 | Kneckt et al. | 455/435.1 |
| 2014/0177618 A1 * | 6/2014 | Shen et al. | 370/338 |

OTHER PUBLICATIONS

International Search Report and Written Opinion—PCT/US2013/036810—ISA/EPO—Jul. 10, 2013.
Stephenson D(Cisco Systems): "Gas LB107 comment resolution ;11-07-2493-01-000u-gas-1b107-comment-resolution" , IEEE Draft; 11-07-2493-01-000U-Gas-LB107-Comment-Resolution, IEEE-SA Mentor, Piscataway, NJ USA, vol. 802.11u, No. 1 , Nov. 12, 2007, pp. 1-37, XP017683043, [retrieved on Nov. 12, 2007].

\* cited by examiner

*Primary Examiner* — Nathan Mitchell
(74) *Attorney, Agent, or Firm* — S. Hossain Beladi

(57) ABSTRACT

A particular method includes generating, at a mobile station, a probe request frame and a service discovery request. At least a first portion of the service discovery request may be encapsulated within the probe request frame to form a modified probe request frame. The modified probe request frame may be wirelessly transmitted, for example, to a particular access point or to all access points with range of the mobile station.

40 Claims, 12 Drawing Sheets

SYSTEM AND METHOD OF SERVICE DISCOVERY

I. CLAIM OF PRIORITY

This application claims priority from U.S. Provisional Patent Application No. 61/635,229 filed on Apr. 18, 2012 and entitled "SYSTEM AND METHOD OF SERVICE DISCOVERY," the contents of which are incorporated herein in their entirety.

II. FIELD

The present disclosure is generally related to communicating service discovery messages.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless communication systems support discovery of services by mobile devices that are fully authenticated and/or associated with an access point (e.g., devices that have performed a handshake procedure and/or exchanged credentials). Authenticating a mobile device with the access point takes time and uses resources of the mobile device, the access point and a communication medium. Accordingly, substantial resources of the wireless communication system may be used in authenticating mobile devices that desire services that are not available via the wireless communication system.

IV. SUMMARY

A mobile device may be configured to send a service discovery request encapsulated within a probe request frame. The probe request frame may be sent to an access point before the mobile device is authenticated by or associated with the access point. The access point may be configured to extract the service discovery request and to send a service discovery response to the mobile device. The service discovery response may be responsive to at least a portion of the service discovery request. Thus, the mobile device may determine services that are available via the access point before the mobile device is authenticated by or associated with the access point. Accordingly, resources used to authenticate the mobile device are saved if the access point is not able to provide services desired by the mobile device.

In a particular embodiment, a method includes generating, at a mobile station, a probe request frame and a service discovery request. At least a first portion of the service discovery request may be encapsulated within the probe request frame to form a modified probe request frame. The modified probe request frame may be wirelessly transmitted to a particular access point (e.g., via unicast to an address associated with the particular access point) or to all access points with range of the mobile station (e.g., via broadcast to a broadcast address).

In another particular embodiment, an apparatus includes a transmitter operable to transmit data wirelessly, a processor coupled to the transmitter, and a memory coupled to the processor. The memory stores instructions executable by the processor to generate a probe request frame, to generate a service discovery request, to encapsulate at least a first portion of the service discovery request within the probe request frame to form a modified probe request frame, and to cause the transmitter to transmit the modified probe request frame.

In another particular embodiment, a non-transitory processor-readable medium includes instructions that, when executed by a processor, cause the processor to generate a probe request frame and to generate a service discovery request. The instructions further cause the processor to encapsulate at least a first portion of the service discovery request within the probe request frame to form a modified probe request frame. The instructions further cause the processor to cause a transmitter to transmit the modified probe request frame.

In another particular embodiment, a method includes receiving a probe request frame from a mobile station at an access point, where the probe request frame includes a service discovery request. The method also includes extracting the service discovery request. The method further includes transmitting a service discovery response to the mobile station from the access point, where the service discovery response is responsive to at least a first portion of the service discovery request.

In another particular embodiment, an apparatus includes a transmitter operable to transmit data wirelessly, a processor, and a memory coupled to the processor. The memory stores instructions executable by the processor to receive a probe request frame from a mobile station, where the probe request frame includes a service discovery request. The instructions are further executable by the processor to extract the service discovery request. The instructions are further executable by the processor to cause the transmitter to transmit a service discovery response to the mobile station from the access point, where the service discovery is response responsive to at least a first portion of the service discovery request.

In another particular embodiment, a non-transitory processor-readable medium includes instructions that, when executed by a processor, cause the processor to receive a probe request frame from a mobile station, where the probe request frame includes a service discovery request. The instructions are further executable by the processor to extract the service discovery request and to transmit a service discovery response to the mobile station from the access point. The service discovery response is responsive to at least a first portion of the service discovery request.

One particular advantage provided by at least one of the disclosed embodiments is that resources used to authenticate a mobile device are saved if an access point is not able to provide services desired by the mobile device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
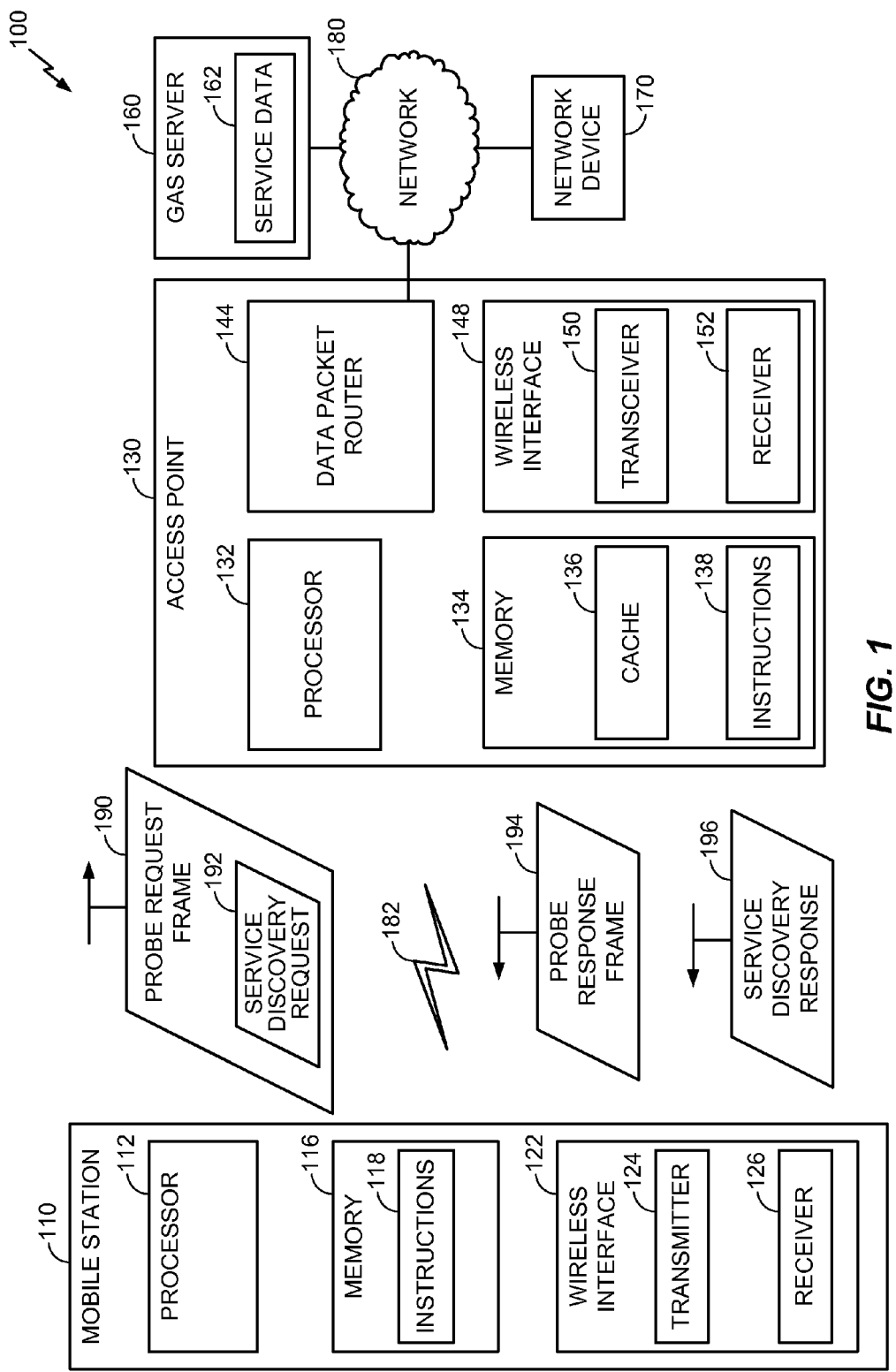
FIG. 1 is a diagram of a particular embodiment of a system that is operable to communicate service discovery messages to and from a mobile station.

Referring to FIG. 1, a particular illustrative embodiment of a system 100 is shown. The system 100 may be configured to generate, format, and/or communicate infrastructure service discovery requests (e.g., Access Network Query Protocol (ANQP) elements) and service discovery responses. The system 100 may include one or more mobile stations, such as a representative mobile station 110, one or more access points, such as a representative access point 130, and one or more generic advertisement service (GAS) servers, such as a representative GAS server 160. The system 100 may also include one or more network devices, such as a representative network device 170.

The mobile station 110 and the access point 130 may communicate via a wireless communication path 182. The access point 130 may communicate with the GAS server 160 and the network device 170 via a network 180. The network 180 may be a wired network, a wireless network, or a combination thereof. The access point 130 may also, or in the alternative, be directly coupled to the GAS server 160. In a particular embodiment, the access point 130 may include the GAS server 160. Accordingly, the mobile station 110 may communicate with the GAS server 160 and the network device 170 via the access point 130.

The mobile station 110 may be configured to transmit probe request frames, such as a representative probe request frame 190 via the wireless communication path 182 to the access point 130. The probe request frame 190 may be compliant with an Institute of Electrical and Electronics Engineers (IEEE) 802.11 standard. In IEEE 802.11 standards, a probe request frame may be used by a mobile station to obtain information from another station or from an access point, such as capabilities of the station or access point, data rates supported by the station or the access point, power constraints of the station or the access point, and various parameters used by or supported by the station or the access point. In a particular embodiment, the probe request frame 190 may be a modified IEEE 802.11-compliant frame that encapsulates a service discovery request 192. Thus, in addition to requesting information about the access point 130, the modified probe request frame 190 encapsulating the service discovery request 192 may request information about services supported by the access point 130. For example, the service discovery request 192 may include an ANQP element that requests information regarding whether the access point 130 supports a particular service or set of services, such as a service provided by the network device 170.

The access point 130 may receive the probe request frame 190 and extract the service discovery request 192. If the access point 130 does not support service discovery requests encapsulated within probe request frames, the access point 130 may discard the service discovery request 192 and respond to the probe request frame 190 by transmitting a probe response frame 194.

If the access point 130 does support service discovery requests encapsulated within probe request frames, the access point 130 attempts to respond to both the probe request frame 190 and the service discovery request 192. For example, the access point 130 may determine whether information that is responsive to the service discovery request 192 is available at a cache 136 of the access point 130. When information that is responsive to the service discovery request 192 is not available at the cache 136, the access point 130 may send a service discovery query based on the service discovery request 192 to the GAS server 160. In some embodiments, the service discovery request 192 may include a request for information regarding more than one service. In such embodiments, information regarding a first service may be available from the cache 136 and information about a second service may not be available from the cache 136. In this circumstance, the access point 130 may respond to the portion of the service discovery request 192 that relates to the first service using information from the cache 136 and may send a service discovery query related to the second service to the GAS server 160 to gather information to generate a response to the portion of the service discovery request 192 that relates to the second service.

In response to the service discovery query, the access point 130 may receive from the GAS server 160 a query response including information that is responsive to at least a portion the service discovery request 192. The access point 130 may generate and transmit a service discovery response 196 including the information that is responsive to at least the portion of the service discovery request 192. The access point 130 may also store the information at the cache 136. By storing the information at the cache 136, the access point 130 may be able to respond to a subsequent service discovery request without sending another service discovery query to the GAS server 160.

In the embodiment illustrated in FIG. 1, the probe response frame 194 and the service discovery response 196 are shown as separate data elements (e.g., data that is transmitted from the access point 130 to the mobile station 110 separately). For example, the service discovery response 196 may be transmitted using a data frame. In another embodiment, the probe response frame 194 and the service discovery response 196 may be transmitted together. For example, the service discovery response 196 may be encapsulated within the probe response frame 194.

In a particular embodiment, the mobile station 110 includes a processor 112, a memory 116, and a wireless interface 122. The processor 112 may be coupled to the memory 116 and to the wireless interface 122. The processor 112 may execute instructions 118 from the memory 116 to generate the probe request frame 190, to generate the service discovery request 192, to encapsulate the service discovery request 192 within the probe request frame 190, to implement an authentication process to establish a connection between the mobile station 110 and the access point 130, or any combination thereof. The wireless interface 122 may include a transmitter 124, a receiver 126, or a combination thereof (e.g., a transceiver).

The access point 130 may include a processor 132, a memory 134, a data packet router 144, and a wireless interface 148. The processor 132 may be coupled to the memory 134 and to the wireless interface 148. The wireless interface 148 may include a transmitter 150, a receiver 152, or a combination thereof (e.g., a transceiver). The processor 132 may execute instructions 138 from the memory 134 to receive the probe request frame 190, to extract the service discovery request 192 from the probe request frame 190, to determine whether information responsive to the service discovery request 192 is available in the cache 136, to send a service discovery query to the GAS server 160 for information responsive to the service discovery request 192 that is not available from the cache 136, and to generate and send the probe response frame 194, the service discovery response 196, or any combination thereof. When information is retrieved from the GAS server 160, the instructions 138 may also be executable to store at least a portion of the retrieved information at the cache 136. The data packet router 144 may send data packets to and received data packets from the GAS server 160, the network device 170 or another device coupled to the network 180.

The GAS server 160 may be coupled to the access point 130 via the network 180, may be directly coupled to the access point 130, may be incorporated within the access point 130, or a combination thereof. The GAS server 160 may maintain service data 162, which includes information regarding services provided by one or more network devices, such as the network device 170. The information maintained at the GAS server 160 for a particular service may include a media access control (MAC) address of the device that provides (and optionally advertises) the particular service, an Internet protocol (IP) address of the device, a device name of the device, a service name of the particular service, a service type of the particular service, or any combination thereof.

Thus, the GAS server 160 and the network device 170 may include information related to one or more services that are accessible to the mobile station 110 via the access point 130. For example, the GAS server 160, the network device 170, or both, may include information related to a media service, a print service, a financial service, a music service, a video service, or a combination thereof.

Thus, the mobile station 110 is able to determine whether particular services are available via the access point 130 before the mobile station 110 initiates a connection to the access point 130. Accordingly, resources that would be used to authenticate the mobile station 110 are saved if the access point 130 is not able to provide services desired by the mobile station 110, since the mobile station 110 will not attempt to authenticate with the access point 130 if the desired services are not available.

Figure 2:
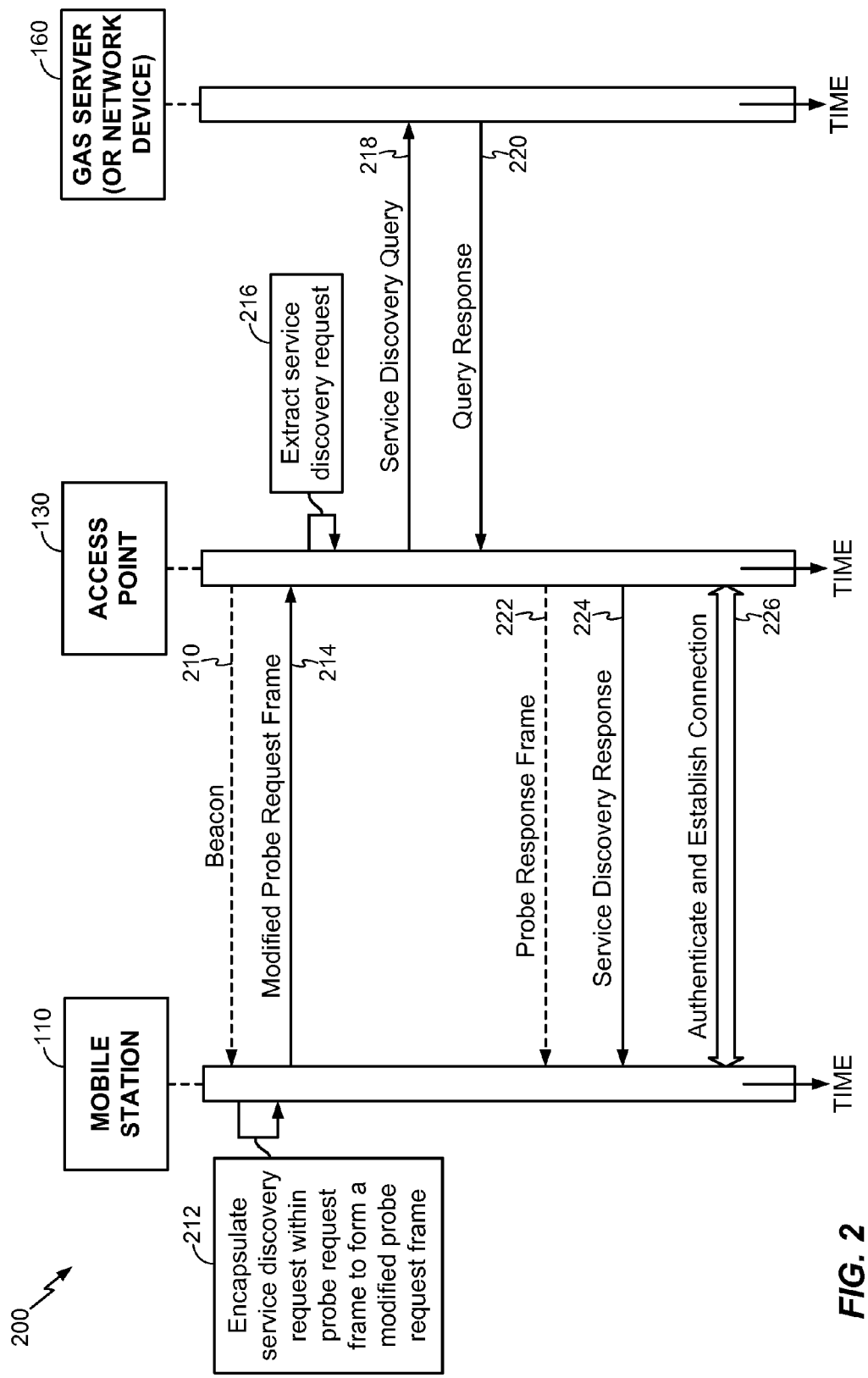
FIG. 2 is a ladder diagram illustrating a first particular embodiment of a method of communicating service discovery messages between a mobile station and an access point.

FIG. 2 is a ladder diagram illustrating a first particular embodiment of a method 200 of communicating service discovery messages between the mobile station 110 and the access point 130. In a particular embodiment, the access point 130 periodically transmits a beacon 210. Either before or after receiving the beacon 210, the mobile station 110 may generate a service discovery request, generate a probe request frame, and encapsulate the service discovery request within the probe request frame to form a modified probe request frame, at 212. The mobile station 110 may transmit the modified probe request frame 214 to the access point 130.

At 216, the access point 130 may receive the modified probe request frame 214 and may extract the service discovery request from the modified probe request frame 214. The access point 130 may generate a service discovery query 218 based on the service discovery request and may send the service discovery query 218 to the GAS server 160 (or another network device). Subsequently, the access point 130 may receive a query response 220 that is responsive to the service discovery query 218. The access point 130 may generate and send a service discovery response 224 based on the query response 220. The service discovery response 224 may be responsive to at least a portion of the service discovery request. For example, the service discovery request may request information regarding a first service and information regarding a second service. In this example, the service discovery response 224 may include the information regarding the first service, information regarding the second service, or information regarding both the first service and the second service.

The access point 130 may also generate and transmit a probe response frame 222. The probe response frame 222 may be sent before the service discovery response 224 is sent, after the service discovery response 224 is sent, or the service discovery response 224 may be encapsulated within the probe response frame 222.

After the mobile station 110 receives the service discovery response 224, the mobile station 110 may initiate a process to establish a connection with the access point 130. For example, the mobile station 110 and the access point 130 may exchange authentication frames or other packets or frames to authenticate the mobile station 110 and/or the access point 130 and to establish the connection, at 226.

Thus, the mobile station 110 is able to determine whether particular services are available via the access point 130 before the mobile station 110 determines whether to initiate a connection to the access point 130. Accordingly, resources used to authenticate the mobile station 110 are saved if the access point 130 is not able to provide services desired by the mobile station 110.

Figure 3:
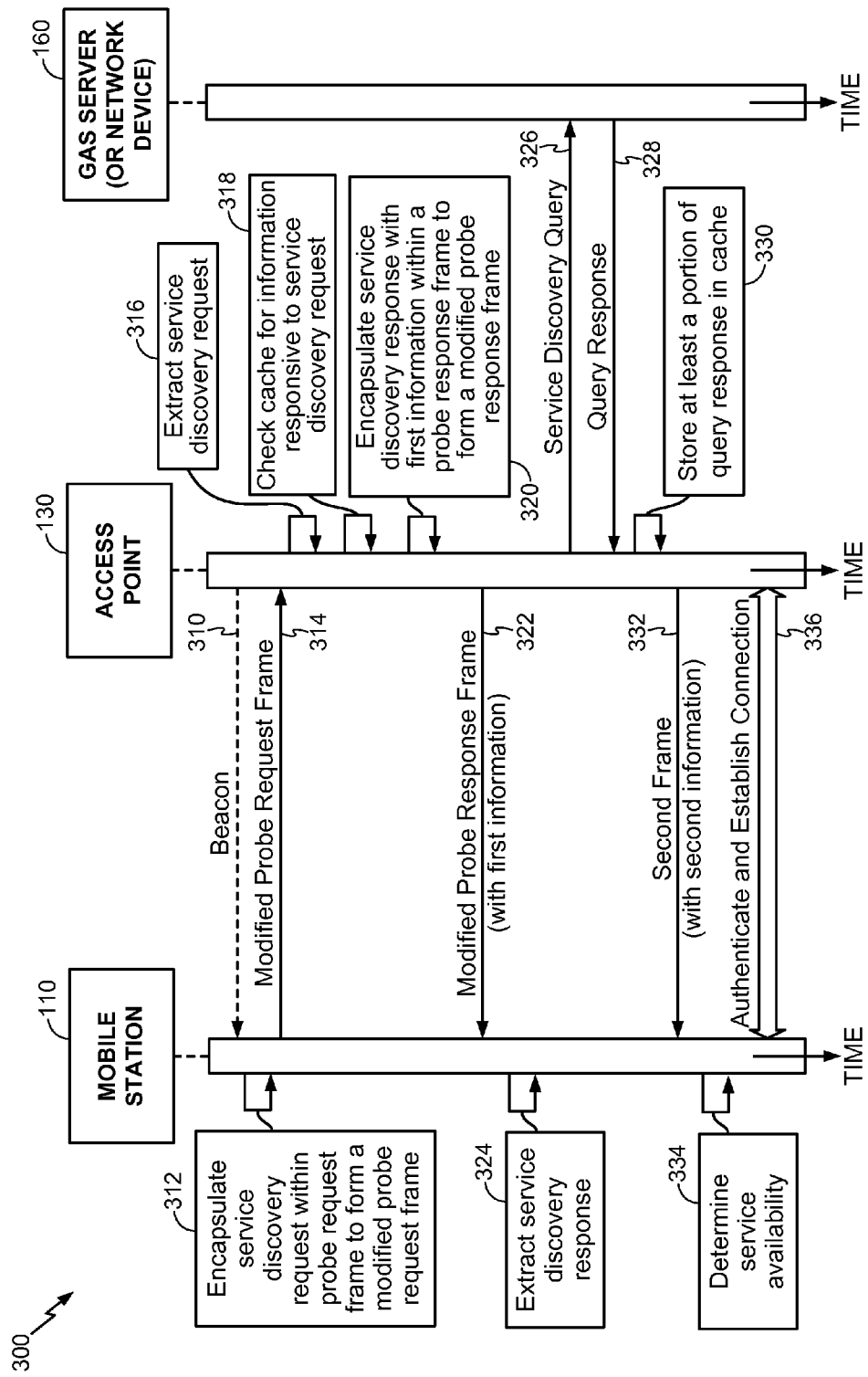
FIG. 3 is a ladder diagram illustrating a second particular embodiment of a method of communicating service discovery messages between a mobile station and an access point.

FIG. 3 is a ladder diagram illustrating a second particular embodiment of a method 300 of communicating service discovery messages between the mobile station 110 and the access point 130. In a particular embodiment, the access point 130 periodically transmits a beacon 310. Either before or after receiving the beacon 310, the mobile station 110 may generate a service discovery request, generate a probe request frame and encapsulate the service discovery request within the probe request frame to form a modified probe request frame, at 312. The mobile station 110 may transmit the modified probe request frame 314 to the access point 130.

The access point 130 may receive the modified probe request frame 314 and may extract the service discovery request from the modified probe request frame 314, at 316. The access point 130 may check a local cache, such as the cache 136 of FIG. 1, to determine whether information responsive to the service discovery request is stored at the cache, at 318. In the embodiment illustrated in FIG. 3, first information that is responsive to a first portion of the service discovery request is available at the cache, and the access point 130 sends the first information to the mobile station 110 while the access point 130 attempts to retrieve second information that is responsive to a second portion of the service discovery request. For example, the access point 130 may generate a service discovery response with the first information and encapsulate the service discovery response within a probe response frame to form a modified probe response frame, at 320. The access point 130 may transmit the modified probe response frame 322 to the mobile station 110. At 324, the mobile station 110 may extract the service discovery response from the modified probe response frame 322.

To retrieve the second information that is responsive to a second portion of the service discovery request, the access point 130 may send a service discovery query 326 to the GAS server 160 or to another network device. The GAS server 160, or the other network device, may send a query response 328 that is responsive to the service discovery query 326 to the access point 130. The access point 130 may store at least a portion of the query response or information from the query response in the cache, at 330. The access point 130 may also generate and send a second frame 332 that includes the second information. The second frame 332 may be a second modified probe response frame that includes the second information in an encapsulated second service discovery response. Alternately, the second frame 332 may be a frame other than a probe response frame, such as a data frame that includes the second information.

At 334, the mobile station 110 may determine, based on the modified probe response frame 322, the second frame 332, or both, whether a particular service is available via the access point 130. When the particular service is available, the mobile station 110 may initiate a process to establish a connection with the access point 130. For example, the mobile station 110 and the access point 130 may exchange authentication frames, or other packets or frames to authenticate the mobile station 110 and/or the access point 130 and to establish the connection, at 336.

Thus, the mobile station 110 is able to determine whether particular services are available via the access point 130 before the mobile station 110 attempts to initiate a connection to the access point 130. If the particular services are not available via the access point 130, the mobile station 110 may determine not to initiate the connection. Accordingly, resources that would be used to authenticate the mobile station 110 may be saved if the access point 130 is not able to provide services desired by the mobile station 110 since the mobile station 110 may not attempt to authenticate with the access point 130.

Figure 4:
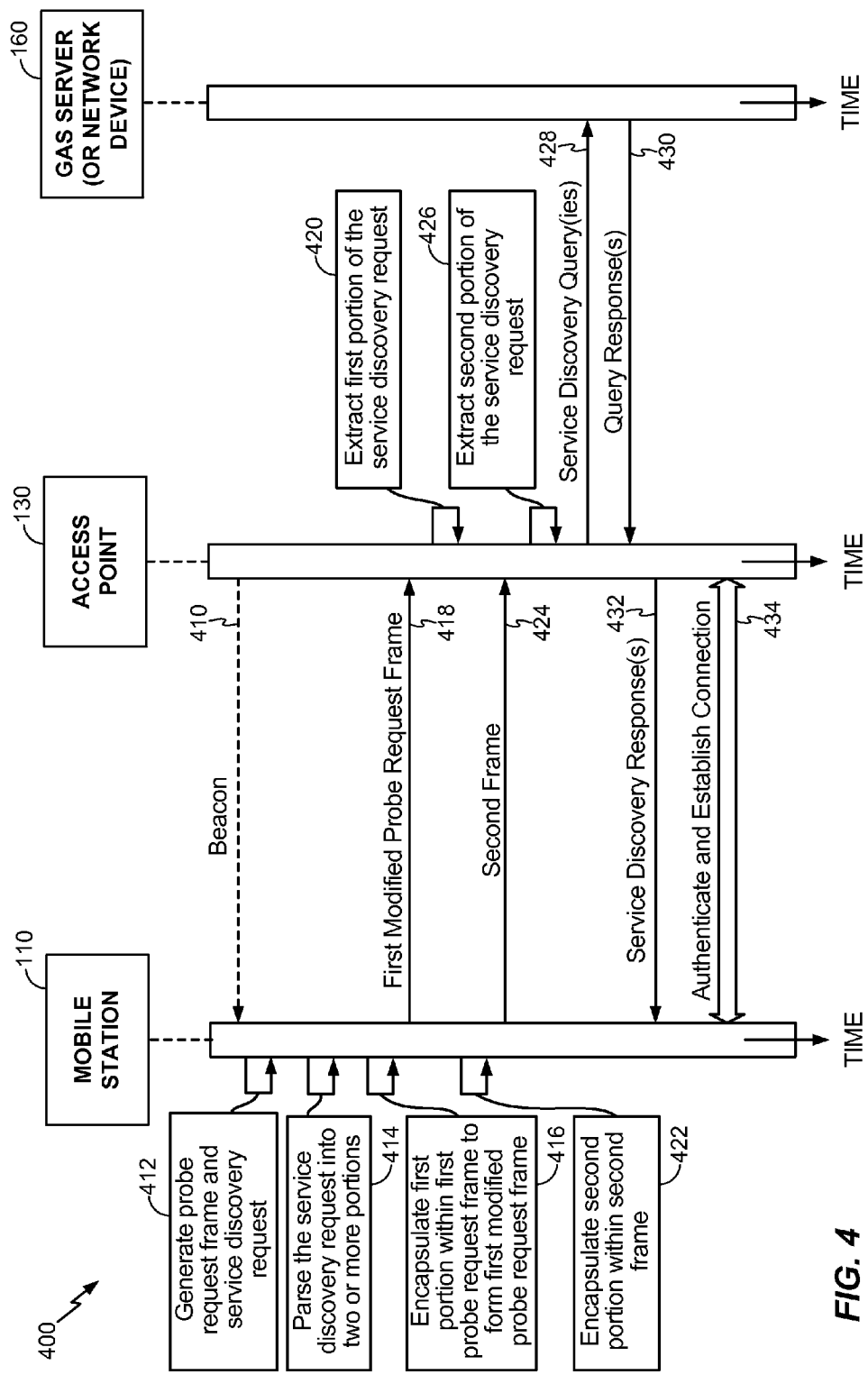
FIG. 4 is a ladder diagram illustrating a third particular embodiment of a method of communicating service discovery messages between a mobile station and an access point.

FIG. 4 is a ladder diagram illustrating a third particular embodiment of a method 400 of communicating service discovery messages between the mobile station 110 and the access point 130. In this particular embodiment, the access point 130 periodically transmits a beacon 410. Either before or after receiving the beacon 410, the mobile station 110 may generate a service discovery request and a probe request frame, at 412. The mobile station 110 may determine whether to parse the service discovery request into two or more portions. For example, if the service discovery request is larger than a threshold size, the service discovery request may be too large to include in a single probe request frame and may be parsed, at 414, into the two or more portions. A first portion of the service discovery request may be encapsulated within a first probe request frame to form a first modified probe request frame, at 416. The mobile station 110 may transmit the first modified probe request frame 418 to the access point 130. At 422, a second portion of the service discovery request may be encapsulated within a second frame 424. The second frame 424 may be a second modified probe request frame, a data frame or another frame. The mobile station 110 may also send the second frame 424 to the access point 130.

The access point 130 may receive the first modified probe request frame 418 and the second frame 424. The access point 130 may extract the first portion of the service discovery request from the modified probe request frame 418, at 420, and may extract the second portion of the service discovery request from the second frame 424, at 426. If the access point 130 has access to information requested by the first portion and the second portion of the service discovery request, the access point 130 may generate a response to the service discovery request. Alternately, if the access point 130 does not have a cache or the cache does not include information responsive to the first portion of the service discovery request, does not include information responsive to the second portion of service discovery request, or both, the access point 130 may send one or more service discovery queries 428 to the GAS server 160. The GAS server 160 may send one or more query responses 430 to the access point 130 in response to the one or more service discovery queries 428.

The access point 130 may generate one or more service discovery responses 432 based on the one or more query responses 430, based on information retrieved from the cache, or based on information retrieved from the cache and information from the one or more query responses 430. The one or more service discovery responses 432 may be sent to the mobile station 110. For example, the one or more service discovery responses 432 may be encapsulated within probe response frames, data frames, other frames or a combination thereof.

The mobile station 110 may determine, based on the one or more service discovery responses 432, whether a particular service is available via the access point 130. When the particular service is available, the mobile station 110 may initiate a process to establish a connection with the access point 130. For example, the mobile station 110 and the access point 130 may exchange authentication frames, or other packets or frames to authenticate the mobile station 110 and/or the access point 130 and to establish the connection, at 434. Conversely, when the particular service is not available, the mobile station 110 may initiate determined not to establish a connection with the access point 130.

Thus, the mobile station 110 is able to determine whether particular services are available via the access point 130 before the mobile station 110 initiates a connection to the access point 130. Accordingly, resources that would be used to authenticate the mobile station 110 may be saved if the access point 130 is not able to provide services desired by the mobile station 110 since the mobile station 110 may not attempt to authenticate with the access point 130.

Figure 5:
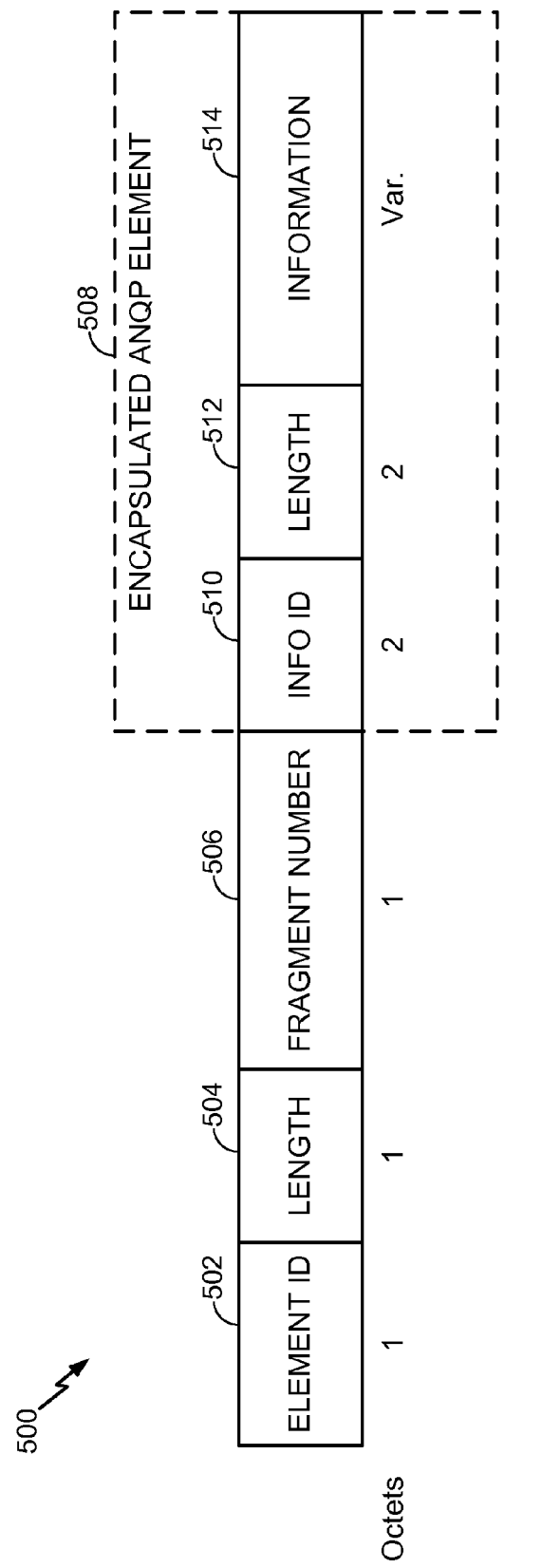
FIG. 5 is a diagram of a particular embodiment of a probe request frame with an encapsulated service discovery request that may be transmitted by the mobile station of FIG. 1.

FIG. 5 is a diagram of a particular embodiment of a probe request frame 500 with an encapsulated service discovery request that may be transmitted by the mobile station 110 of FIG. 1. In the embodiment illustrated in FIG. 5, the service discovery request is an Access Network Query Protocol (ANQP) element 508.

The probe request frame 500 includes an element identifier 502, a length indicator 504, a fragment number 506 and the encapsulated ANQP element 508. The element identifier 502 includes a single octet that indicates a type of the frame, which in the embodiment of FIG. 5 is a probe request frame. The length indicator 504 includes a single octet that indicates a length of the probe request frame 500. The fragment number 506 includes a single octet that indicates a sequence number of the probe request frame 500 relative to other frames that have been generated by a mobile station that generated the probe request frame 500. While the element identifier 502, the length indicator 504, and the fragment number 506 are described with reference to FIG. 5 as each including a single octet, in other embodiments, the element identifier 502, the length indicator 504, the fragment number 506, or any combination thereof, may include more than one octet (e.g., two or more octets) or less than one octet (e.g., one or more bits).

The encapsulated ANQP element 508 includes an information identifier 510, a length indicator 512, and an information field 514. The information identifier 510 may include one or more octets, e.g., two octets, that indicate a particular ANQP capabilities table that is associated with information being requested by the service discovery request. The length indicator 512 may include one or more octets, e.g., two octets, that indicate how many capabilities (e.g., services) the service discovery request relates to. For example, when the service discovery request requests information regarding two services, the two services may be identified by values in the information field 514 and a value of the length indicator 512 may indicate that two services or capabilities are being asked about via the service discovery request.

Figure 6:
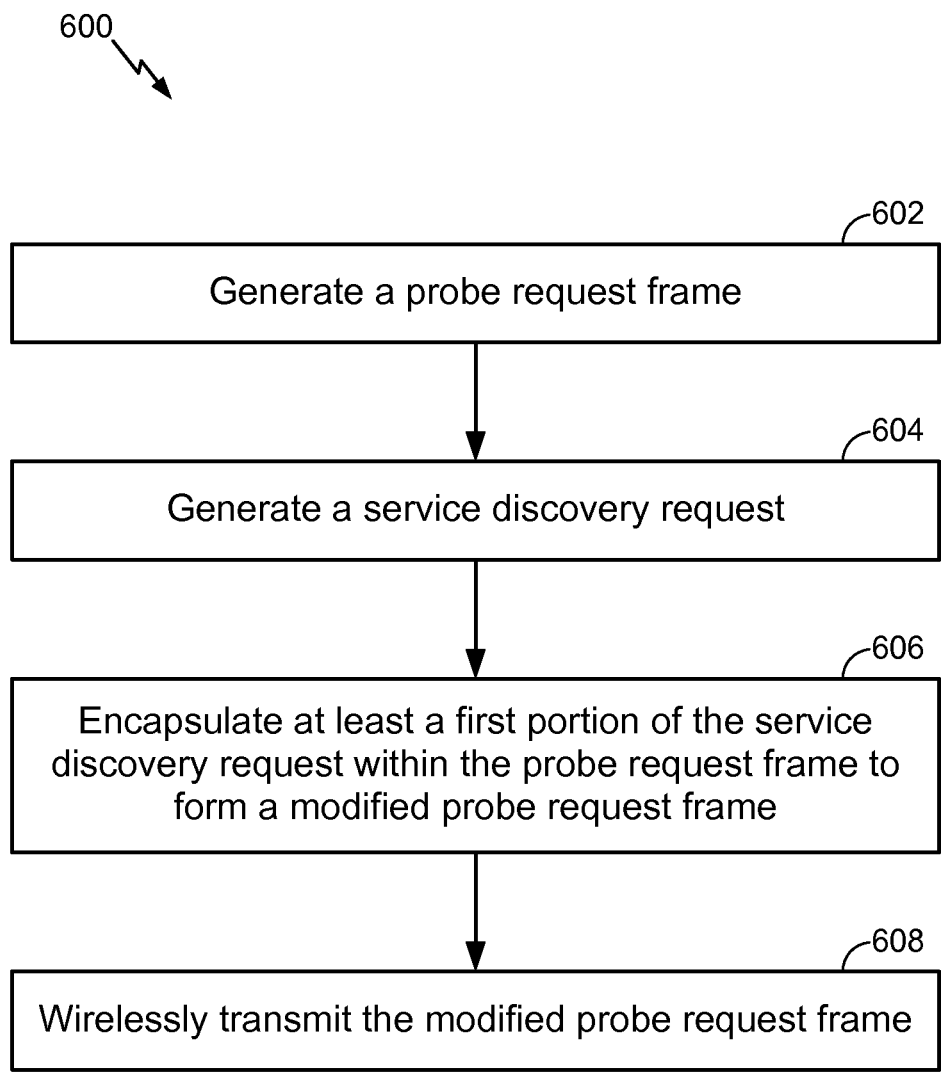
FIG. 6 is a flowchart illustrating a first particular embodiment of a method of communicating a service discovery request from a mobile station to an access point.

FIG. 6 is a flowchart illustrating a first particular embodiment of a method 600 of communicating a service discovery request from a mobile station, such as the mobile station 110 of FIGS. 1-4, to an access point, such as the access point 130 of FIGS. 1-4. The method 600 includes, at 602, generating a probe request frame at a mobile station. The method 600 also includes, at 604, generating a service discovery request at the mobile station. The method 600 also includes, at 606, encapsulating at least a first portion of the service discovery request within the probe request frame to form a modified probe request frame. The method further includes, at 608, wirelessly transmitting the modified probe request frame.

Figure 7:
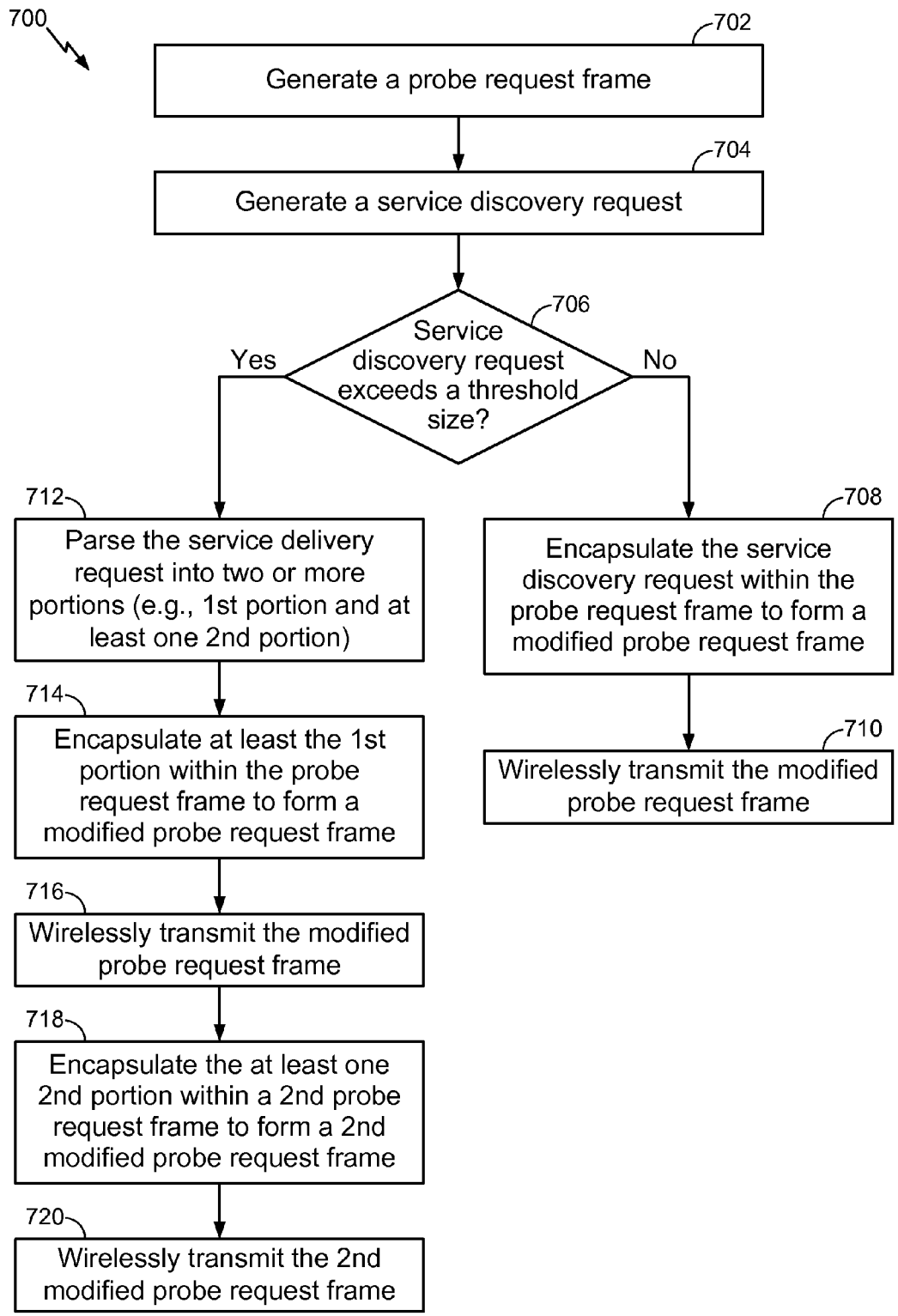
FIG. 7 is a flowchart illustrating a second particular embodiment of a method of communicating a service discovery request from a mobile station to an access point.

FIG. 7 is a flowchart illustrating a second particular embodiment of a method 700 of communicating a service discovery request from a mobile station, such as the mobile station 110 of FIGS. 1-4, to an access point, such as the access point 130 of FIGS. 1-4. The method 700 includes, at 702, generating a probe request frame at the mobile station. The method 700 also includes, at 704, generating a service discovery request at the mobile station.

The method 700 also includes, at 706, determining whether the service discovery request exceeds a threshold size. For example, the threshold size may be about 255 bytes to allow each portion of the service discovery request to be encapsulated within the probe request frame. If the service discovery request does not exceed the threshold size, at 706, the method 700 may include, at 708, encapsulating the service discovery request within the probe request to form a modified probe request. The modified probe request may be wirelessly transmitted, at 710.

If the service discovery request exceeds the threshold size, the method 700 may include, at 712, parsing the service delivery request into two or more portions, such as a first portion and at least one second portion. Each portion may be smaller than or equal to the threshold size and may request information related to one or more services. The method 700 may also include, at 714, encapsulating at least the first portion of the service discovery request within the probe request frame to form a modified probe request frame. The modified probe request frame may be wirelessly transmitted, at 716.

The method 700 may also include, at 718, encapsulating the at least one second portion of the service discovery request within a second probe request frame to form a second modified probe request frame. The second modified probe request frame may be wirelessly transmitted, at 720.

Figure 8:
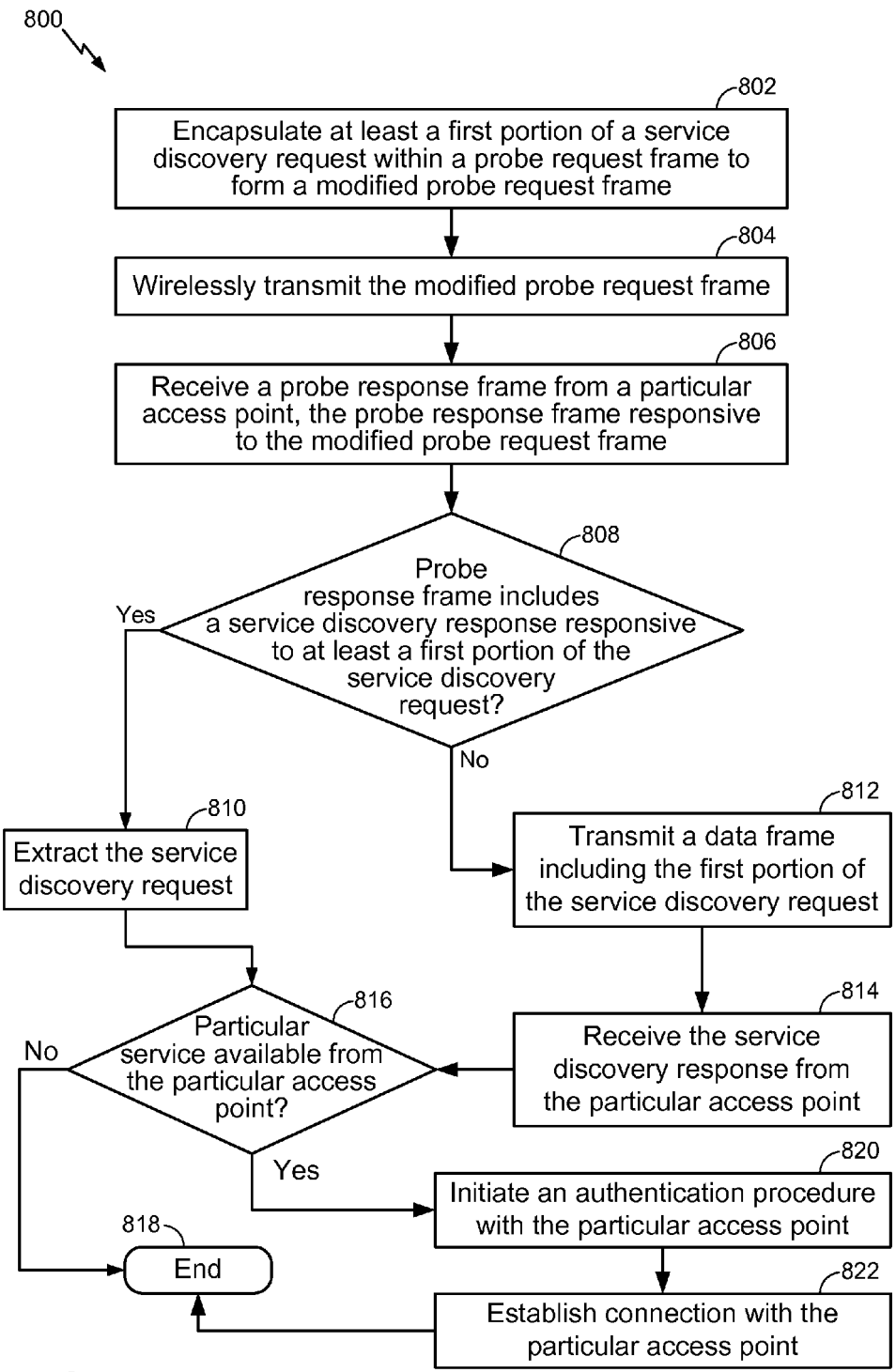
FIG. 8 is a flowchart illustrating a third particular embodiment of a method of communicating a service discovery request from a mobile station to an access point.

FIG. 8 is a flowchart illustrating a third particular embodiment of a method 800 of communicating a service discovery request from a mobile station, such as the mobile station 110 of FIGS. 1-4, to an access point, such as the access point 130 of FIGS. 1-4. The method 800 includes, at 802, encapsulating at least a first portion of a service discovery request within a probe request frame to form a modified probe request frame. The method 800 further includes, at 804, wirelessly transmitting the modified probe request frame from the mobile station to the access point. The modified probe request frame may be broadcast to access points within range of the mobile station (i.e., transmitted to a broadcast address) or may be unicast to a particular access point (i.e., transmitted to an address of the particular access point).

The method 800 further includes, at 806, receiving a probe response frame from a particular access point. The probe response frame may be responsive to the modified probe request frame. The method 800 further includes, at 808, determining whether the probe response frame includes a service discovery response that is responsive to at least a first portion of the service discovery request. When the probe response frame includes a service discovery response that is responsive to at least the first portion of the service discovery request, the method 800 proceeds to extract the service discovery response, at 810.

When the probe response frame does not include a service discovery response that is responsive to at least the first portion of the service discovery request, the method 800 proceeds to transmit a data frame including the first portion of the service discovery request, at 812. After transmitting the data frame, the method 800 may include, at 814, receiving a service discovery response from a particular access point. After receiving the service discovery response, at 814, or, if a service discovery response is embedded in a probe response frame, after extracting the service discovery response, at 810, the method 800 may include determining whether a particular service is available from the particular access point, at 816. When the particular service is not available from the particular access point, the method 800 ends, at 818. When the particular service is available from the particular access point, the method 800 may include, at 820, initiating an authentication procedure with the particular access point, and after completing the authentication procedure, at 822, establishing a connection with the particular access point.

Thus, the method 800 enables the mobile station to determine whether particular services are available via the access point before the mobile station initiates a connection to the access point. Accordingly, resources that would be used to authenticate the mobile station may be saved if the access point is not able to provide services desired by the mobile station since the mobile station may not attempt to authenticate with the access point.

Figure 9:
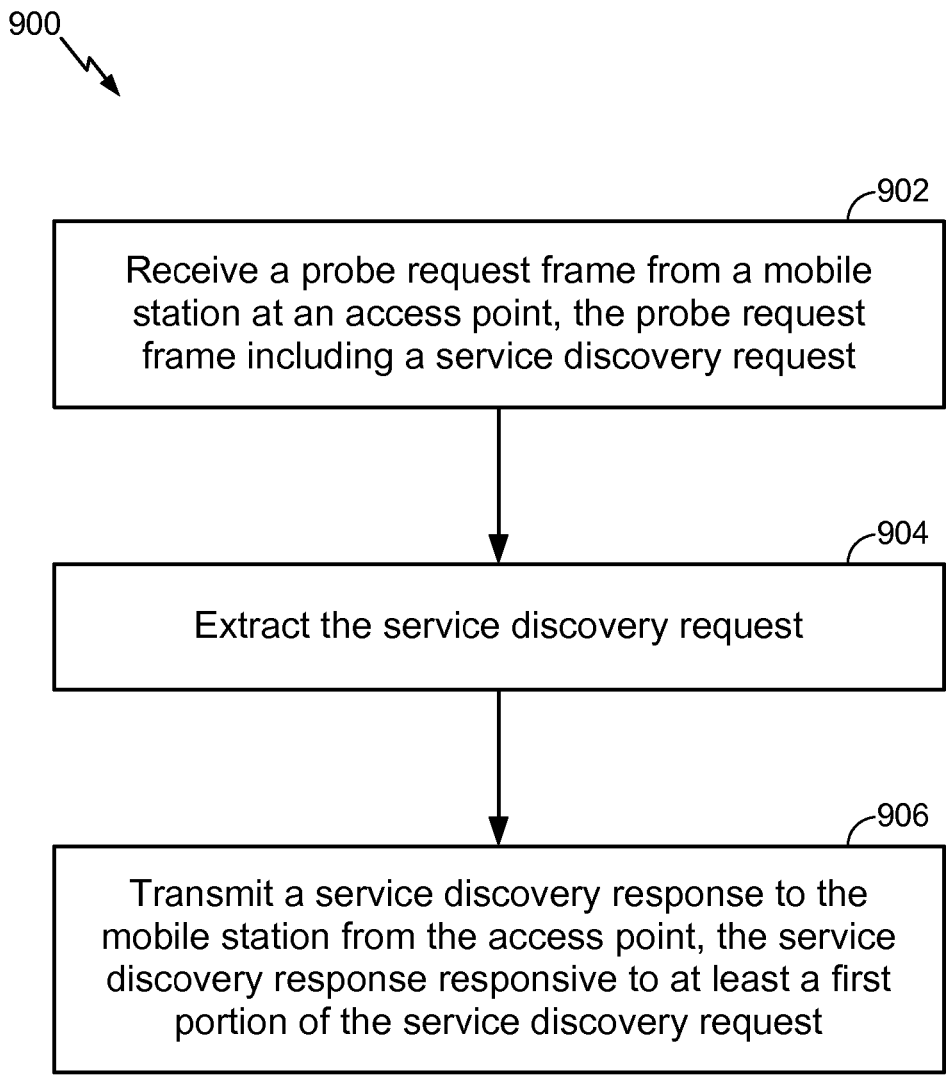
FIG. 9 is a flowchart illustrating a first particular embodiment of a method of communicating a service discovery response from an access point to a mobile station.

FIG. 9 is a flowchart illustrating a first particular embodiment of a method 900 of communicating a service discovery response from an access point, such as the access point 130 of FIGS. 1-4, to a mobile station, such as the mobile station 110 of FIGS. 1-4.

The method 900 includes, at 902, receiving a probe request frame from a mobile station at an access point, where the probe request frame includes a service discovery request. The method 900 also includes, at 904, extracting the service discovery request. The method 900 further includes, at 906, transmitting a service discovery response to the mobile station from the access point, where the service discovery response is responsive to at least a first portion of the service discovery request.

Figure 10:
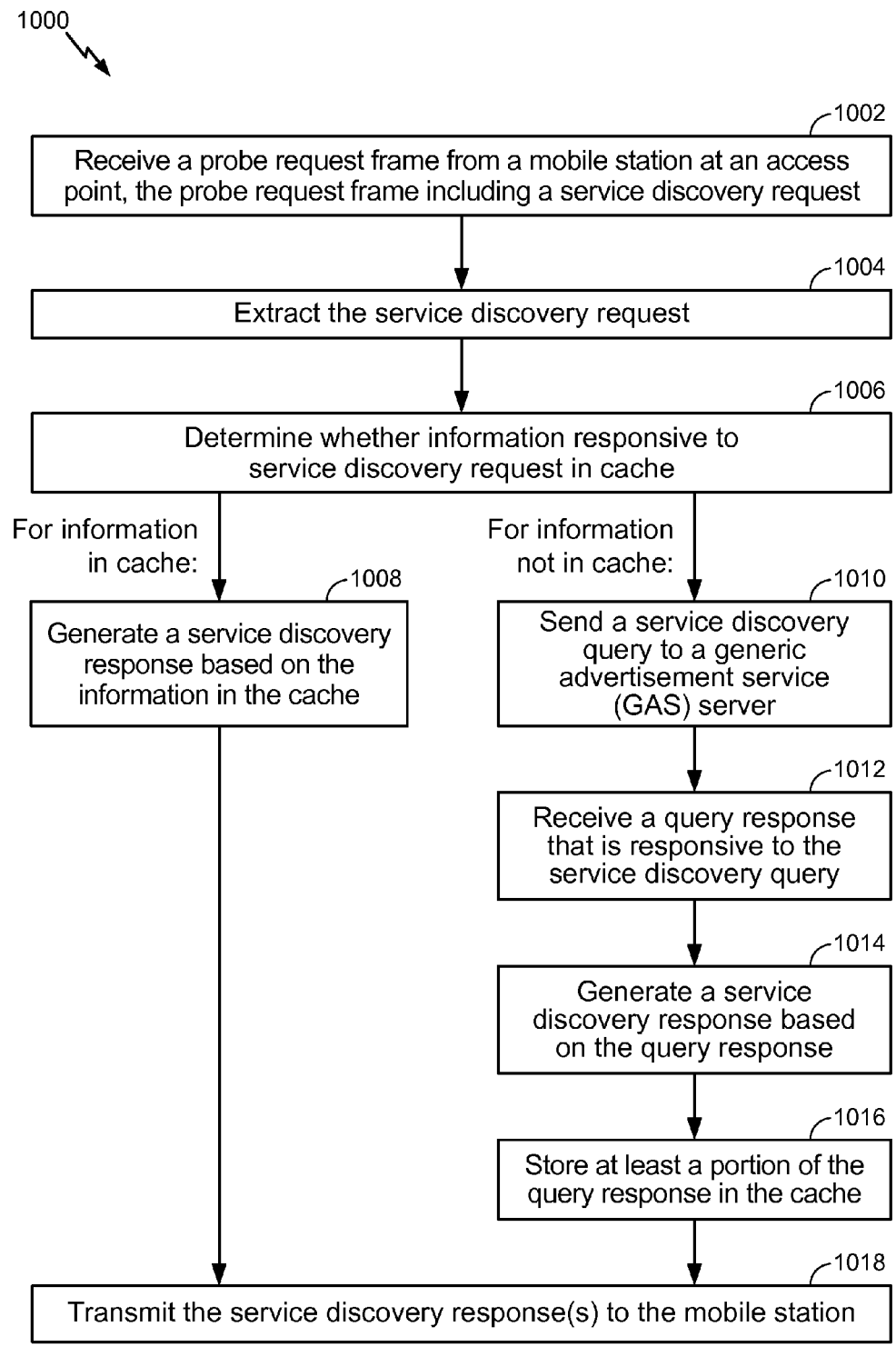
FIG. 10 is a flowchart illustrating a second particular embodiment of a method of communicating a service discovery response from an access point to a mobile station.

FIG. 10 is a flowchart illustrating a second particular embodiment of a method 1000 of communicating a service discovery response from an access point, such as the access point 130 of FIGS. 1-4, to a mobile station, such as the mobile station 110 of FIGS. 1-4.

The method 1000 includes, at 1002, receiving a probe request frame from a mobile station at an access point, where the probe request frame includes a service discovery request. The method 1000 also includes, at 1004, extracting the service discovery request. The method 1000 further includes, at 1006, determining whether information responsive to service discovery request in cache.

For information that is available in the cache, the method 1000 includes, at 1008, generating a service discovery response or service discovery responses based on the information in the cache, and, at 1018, transmitting the service discovery response to the mobile station.

For information that is not available in the cache, the method 1000 includes, at 1010, sending a service discovery query to a generic advertisement service (GAS) server. The method 1000 also includes, at 1012, receiving a query response that is responsive to the service discovery query from the GAS server. The method 1000 further includes, at 1014, generating a service discovery response based on the query response. At least a portion of the query response may be stored in the cache, at 1016. The method 1000 also includes, at 1018, transmitting the service discovery response or service discovery responses to the mobile station.

In a particular embodiment, the service discovery request may request information regarding more than one service. In this embodiment, first information responsive to a first portion of the service discovery request (e.g., related to a first service) may be available in the cache, and second information that is responsive to a second portion of the service discovery request (e.g., related to a second service) may not be available in the cache. In this embodiment, the first information may be sent to the mobile device via a first service discovery response and the second information may be retrieved from the GAS server via the service discovery query. After the second information is retrieved, a second service discovery response including the second information may be sent to the mobile device. The first service discovery response and the second discovery response may be communicated using different types of frames. For example, the first service discovery response may be encapsulated within a probe response frame that is responsive to the probe request frame. The second service discovery response may be transmitted via another type of frame, such as a data frame.

Figure 11:
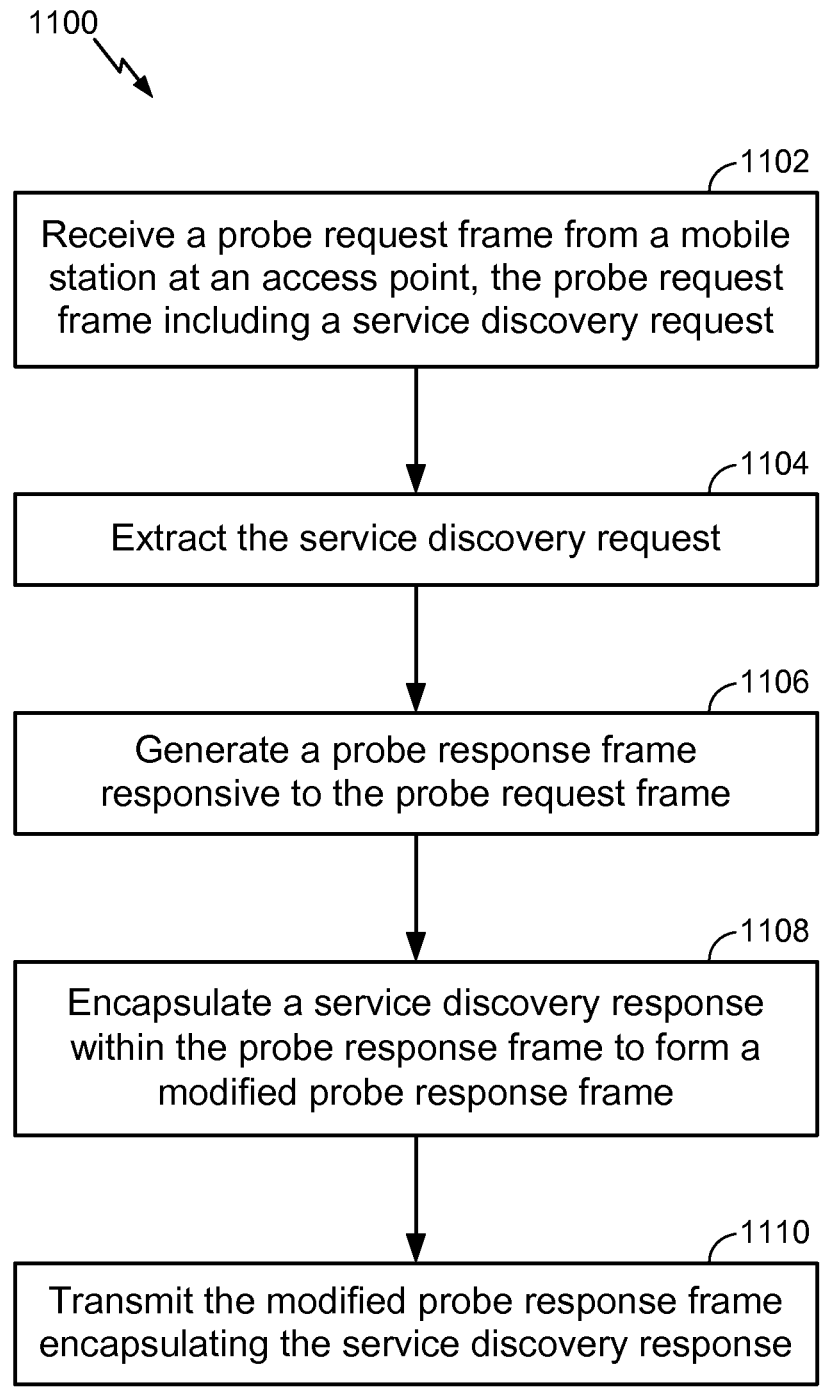
FIG. 11 is a flowchart illustrating a third particular embodiment of a method of communicating a service discovery response from an access point to a mobile station.

FIG. 11 is a flowchart illustrating a third particular embodiment of a method 1100 of communicating a service discovery response from an access point, such as the access point 130 of FIGS. 1-4, to a mobile station, such as the mobile station 110 of FIGS. 1-4.

The method 1100 includes, at 1102, receiving a probe request frame from a mobile station at an access point, where the probe request frame includes a service discovery request. The method 1100 also includes, at 1104, extracting the service discovery request. The method 1100 further includes, at 1106, generating a probe response frame responsive to the probe request frame. The method 1100 may further include, at 1108, encapsulating a service discovery response within the probe response frame to form a modified probe response frame. The method 1100 may further include, at 1110, transmitting the modified probe response frame encapsulating the service discovery response.

It should be noted that the methods of FIGS. 2-4 and 6-11 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods of FIGS. 2-4 and 6-11 can be performed by one or more processors that execute instructions, as further described with reference to FIG. 12.

Figure 12:
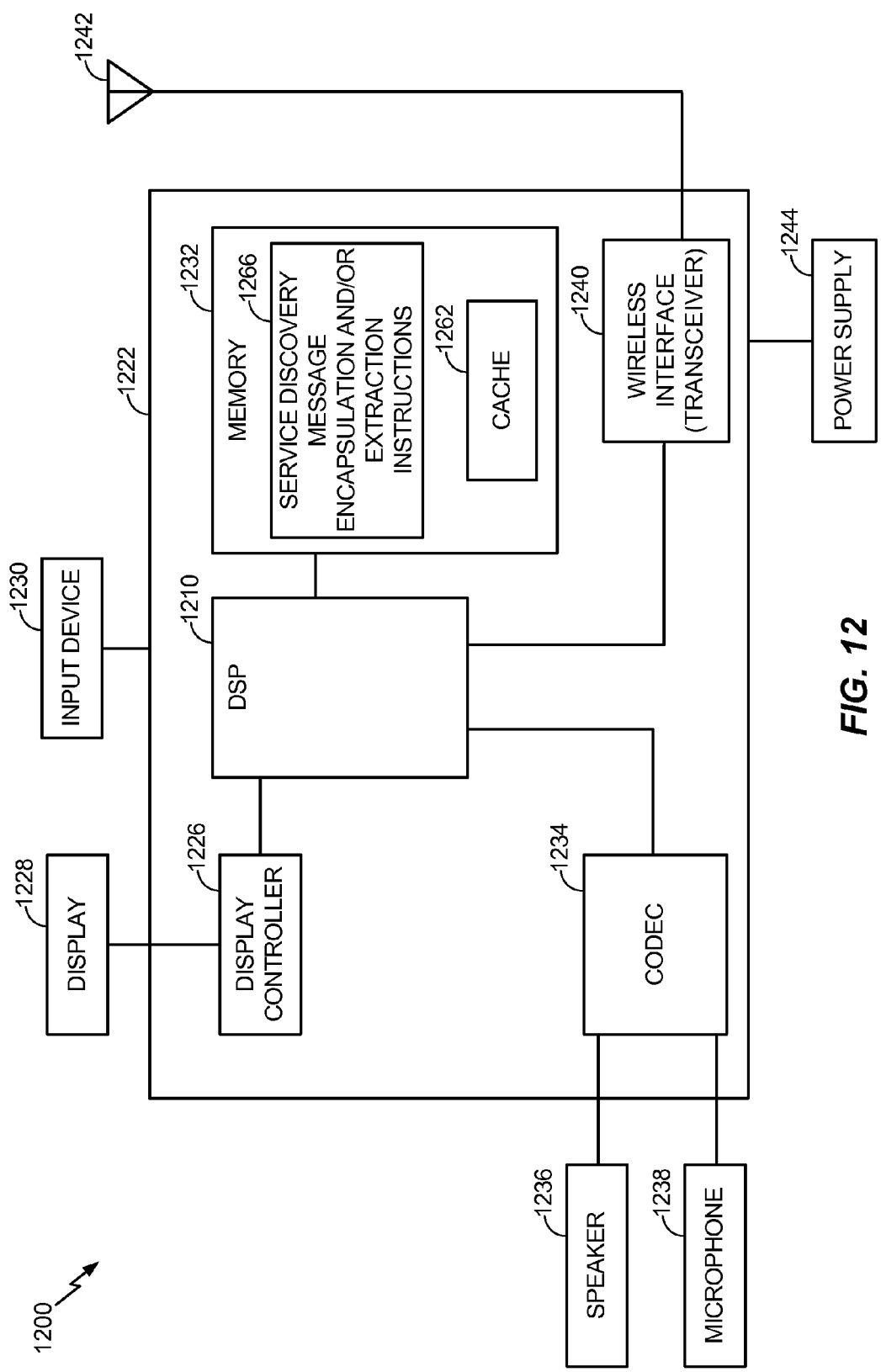
FIG. 12 is a block diagram of a wireless device configured for service discovery.

Referring to FIG. 12, a block diagram of a particular illustrative embodiment of a communication device is depicted and generally designated 1200. The communication device 1200, or components thereof, may include, implement, or be included within a device such as a mobile station, an access point, a GAS server, an advertisement server, a set top box, an entertainment unit, a navigation device, a communications device, a personal digital assistant (PDA), a fixed location data unit, a mobile location data unit, a mobile phone, a cellular phone, a computer, a portable computer, a desktop computer, a tablet, a monitor, a computer monitor, a television, a tuner, a radio, a satellite radio, a music player, a digital music player, a portable music player, a video player, a digital video player, a digital video disc (DVD) player, and a portable digital video player, each of which may be configured to execute one or more of the methods of FIGS. 2-4 and 6-11. For example, the communication device 1200 may correspond to the mobile station 110 of FIGS. 1-4. In another example, the communication device 1200 may correspond to the access point 130 of FIGS. 1-4.

The communication device 1200 includes a processor 1210, such as a digital signal processor (DSP), coupled to a memory 1232. In a particular embodiment, the memory 1232 includes service discovery message encapsulation and/or extraction instructions 1266. The service discovery message encapsulation and/or extraction instructions 1266 may be executable by the processor 1210 to encapsulate a service discovery message, such as a service discovery request or a service discovery response, within a communication frame, such as a probe request frame, a probe response frame, a data frame or another frame. The service discovery message encapsulation and/or extraction instructions 1266 may also or in the alternative be executable by the processor 1210 to extract a service discovery message, such as a service discovery request or a service discovery response, from a communication frame, such as a probe request frame, a probe response frame, a data frame or another frame. Thus, the service discovery message encapsulation and/or extraction instructions 1266 may provide means for generating a probe request frame, means for generating a service discovery request, means for encapsulating at least a first portion of the service discovery request within the probe request frame to form a modified probe request frame, or a combination thereof. The service discovery message encapsulation and/or extraction instructions 1266 and/or the processor 1210 may also or in the alternative provide means for receiving a probe request frame from a mobile station at an access point, where the probe request frame includes a service discovery request, means for extracting the service discovery request, or a combination thereof. The service discovery message encapsulation and/or extraction instructions 1266 may include computer-readable instructions or processor-readable instructions. The instructions 1266 may include one or more instructions that are executable by a computer, such as the processor 1210.

When the communication device 1200 is an access point, the memory may include a cache 1262. The cache 1262 may be configured to store information regarding services that are available via the communication device 1200.

In the particular embodiment illustrated in FIG. 12, the communication device 1200 includes a display controller 1226 that is coupled to the processor 1210 and to a display 1228. A coder/decoder (CODEC) 1234 can also be coupled to the processor 1210. A speaker 1236 and a microphone 1238 can be coupled to the CODEC 1234.

A wireless interface 1240 (e.g. a receiver, a transmitter, or a transceiver) can be coupled to the processor 1210 and to an antenna 1242. For example, the wireless interface 1240 may include the wireless interface 122 or the wireless interface 148 of FIG. 1. The wireless interface 1240 may provide means for wirelessly transmitting a modified probe request frame (e.g. a probe request frame encapsulating a service discovery request), means for transmitting a service discovery response that is responsive to at least a first portion of a service discovery request, or both.

In a particular embodiment, the processor 1210, the display controller 1226, the memory 1232, the CODEC 1234, and the wireless interface 1240 (e.g., a wireless controller) are included in a system-in-package or system-on-chip device 1222. In a particular embodiment, an input device 1230 and a power supply 1244 are coupled to the system-on-chip device 1222. Moreover, in a particular embodiment, as illustrated in FIG. 12, the display 1228, the input device 1230, the speaker 1236, the microphone 1238, the antenna 1242, and the power supply 1244 are external to the system-on-chip device 1222. However, each of the display 1228, the input device 1230, the speaker 1236, the microphone 1238, the antenna 1242, and the power supply 1244 can be coupled to a component of the system-on-chip device 1222, such as an interface or a controller.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
generating, at a mobile station, a probe request frame;
generating, at the mobile station, a service discovery request;
determining that the service discovery request exceeds a threshold size;
parsing the service discovery request into two or more portions;
encapsulating at least a first portion of the service discovery request within the probe request frame to form a modified probe request frame;
encapsulating at least one second portion of the service discovery request within a second probe request frame to form a second modified probe request frame; and
wirelessly transmitting both the modified probe request frame and the second modified probe request frame.

2. The method of claim 1, wherein the modified probe request frame is transmitted to a broadcast address.

3. The method of claim 1, wherein the modified probe request frame is transmitted to an address of a particular access point.

4. The method of claim 1, wherein the service discovery request includes an Access Network Query Protocol (ANQP) query.

5. The method of claim 1, wherein the service discovery request is configured to query an access point for information about a service provided by the access point, a service provided by a network device coupled to the access point, or any combination thereof.

6. The method of claim 1, further comprising receiving a probe response frame from a particular access point, the probe response frame responsive to the modified probe request frame.

7. The method of claim 6, further comprising receiving a service discovery response from the particular access point after receiving the probe response frame, the service discovery response responsive to the first portion of the service discovery request.

8. The method of claim 6, further comprising:
determining whether the probe response frame includes a service discovery response responsive to at least the first portion of the service discovery request; and
when the probe response frame does not include the service discovery response, transmitting a data frame including the first portion of the service discovery request.

9. The method of claim 6, wherein a service discovery response responsive to at least the first portion of the service discovery request is encapsulated within the probe response frame.

10. The method of claim 9, further comprising:
extracting the service discovery response from the probe response frame; and
determining whether a particular service is available from the particular access point based on the service discovery response.

11. The method of claim 10, further comprising:
in response to determining, based on the service discovery response, that the particular service is available from the particular access point, initiating an authentication procedure with the particular access point subsequent to receiving the probe response frame; and
establishing a connection with the particular access point after completion of the authentication procedure.

12. An apparatus comprising:
a transmitter;
a processor coupled to the transmitter; and
a memory coupled to the processor, wherein the memory stores instructions executable by the processor to:
generate a probe request frame;
generate a service discovery request;
determine that the service discovery request exceeds a threshold size;
parse the service discovery request into two or more portions;
encapsulate at least a first portion of the service discovery request within the probe request frame to form a modified probe request frame;
encapsulate at least one second portion of the service discovery request within a second probe request frame to form a second modified probe request frame; and
cause the transmitter to transmit both the modified probe request frame and the second modified probe request frame.

13. The apparatus of claim 12, wherein the modified probe request frame is transmitted to a broadcast address.

14. The apparatus of claim 12, wherein the modified probe request frame is transmitted to an address of a particular access point.

15. The apparatus of claim 12, wherein the service discovery request includes an Access Network Query Protocol (ANQP) query.

16. The apparatus of claim 12, wherein the service discovery request is configured to query an access point for information about a service provided by the access point, a service provided by a network device coupled to the access point, or any combination thereof.

17. The apparatus of claim 12, wherein the memory further stores instructions executable by the processor to receive a probe response frame from a particular access point, the probe response frame responsive to the modified probe request frame.

18. The apparatus of claim 17, wherein the memory further stores instructions executable by the processor to receive a service discovery response from the particular access point after receiving the probe response frame.

19. The apparatus of claim 17, wherein the memory further stores instructions executable by the processor to:
determine whether the probe response frame includes a service discovery response responsive to at least the first portion of the service discovery request; and
when the probe response frame does not include the service discovery response, transmit a data frame including the first portion of the service discovery request.

20. The apparatus of claim 17, wherein a service discovery response responsive to at least the first portion of the service discovery request is encapsulated within the probe response frame.

21. The apparatus of claim 20, wherein the memory further stores instructions executable by the processor to:
extract the service discovery response from the probe response frame; and
determine whether a particular service is available from the particular access point based on the service discovery response.

22. The apparatus of claim 21, wherein the memory further stores instructions executable by the processor to:
in response to determining, based on the service discovery response, that the particular service is available from the particular access point, initiate an authentication procedure with the particular access point subsequent to receiving the probe response frame; and
establish a connection with the particular access point after completion of the authentication procedure.

23. A non-transitory processor-readable medium comprising instructions that, when executed by a processor, cause the processor to:
generate a probe request frame;
generate a service discovery request;
determine that the service discovery request exceeds a threshold size;
parse the service discovery request into two or more portions;
encapsulate at least a first portion of the service discovery request within the probe request frame to form a modified probe request frame;
encapsulate at least one second portion of the service discovery request within a second probe request frame to form a second modified probe request frame; and
cause a transmitter to transmit both the modified probe request frame and the second modified probe request frame.

24. An apparatus comprising:
means for generating, at a mobile station, a probe request frame;
means for generating, at the mobile station, a service discovery request;
means for determining that the service discovery request exceeds a threshold size;
means for parsing the service discovery request into two or more portions;
means for encapsulating at least a first portion of the service discovery request within the probe request frame to form a modified probe request frame;
means for encapsulating at least one second portion of the service discovery request within a second probe request frame to form a second modified probe request frame; and
means for wirelessly transmitting both the modified probe request frame and the second modified probe request frame.

25. A method comprising:
receiving a probe request frame from a mobile station at an access point, wherein the probe request frame includes a service discovery request;
extracting the service discovery request, wherein the service discovery request includes at least a first portion and a second portion, and wherein information responsive to the first portion of the service discovery request is stored at a cache of the access point;
generating a service discovery response based on the information responsive to the first portion of the service discovery request stored at the cache; and
transmitting the service discovery response to the mobile station from the access point, the service discovery response responsive to at least the first portion of the service discovery request.

26. The method of claim 25, further comprising:
generating, at the access point, a probe response frame responsive to the probe request frame; and encapsulating the service discovery response within the probe response frame to form a modified probe response frame,
wherein transmitting the service discovery response comprises transmitting the modified probe response frame encapsulating the service discovery response.

27. The method of claim 25, further comprising:
sending a service discovery query based on the service discovery request to a generic advertisement service (GAS) server; and
receiving a query response that is responsive to the service discovery query, wherein the service discovery response is generated based at least partially on the query response.

28. The method of claim 27, further comprising storing at least a portion of the query response at the cache of the access point.

29. The method of claim 25, further comprising:
determining that information responsive to the second portion is not stored at the cache;
sending a service discovery query based on the second portion of the service discovery request to a generic advertisement service (GAS) server;
receiving a query response that is responsive to the service discovery query, wherein the service discovery response includes the information responsive to the second portion of the service discovery request;
generating a second service discovery response based on the query response; and
transmitting the second service discovery response to the mobile station.

30. The method of claim 29, wherein the service discovery response is encapsulated in a probe response frame and the second service discovery response is transmitted in a second frame that is not a probe response frame.

31. The method of claim 25, wherein the service discovery request is an Access Network Query Protocol (ANQP) query.

32. An apparatus comprising:
a transmitter;
a processor; and
a memory coupled to the processor, wherein the memory stores instructions executable by the processor to:
receive a probe request frame from a mobile station, wherein the probe request frame includes a service discovery request;
extract the service discovery request, wherein the service discovery request includes at least a first portion and a second portion, and wherein information responsive to the first portion of the service discovery request is stored at a cache of an access point;
generate a service discovery response based on the information responsive to the first portion of the service discovery request stored at the cache; and
cause the transmitter to transmit the service discovery response to the mobile station from the access point, the service discovery response responsive to at least the first portion of the service discovery request.

33. The apparatus of claim 32, wherein the memory stores instructions executable by the processor to:
generate a probe response frame responsive to the probe request frame; and
encapsulate the service discovery response within the probe response frame to form a modified probe response frame,
wherein transmitting the service discovery response comprises transmitting the modified probe response frame encapsulating the service discovery response.

34. The apparatus of claim 32, wherein the memory stores instructions executable by the processor to:
send a service discovery query based on the service discovery request to a generic advertisement service (GAS) server; and
receive a query response that is responsive to the service discovery query, wherein the service discovery response is generated based at least partially on the query response.

35. The apparatus of claim 34, wherein the memory stores instructions executable by the processor to store at least a portion of the query response at the cache of the access point.

36. The apparatus of claim 32, wherein the memory stores instructions executable by the processor to:
determine that information responsive to the second portion is not stored at the cache;
send a service discovery query based on the second portion of the service discovery request to a generic advertisement service (GAS) server;
receive a query response that is responsive to the service discovery query, wherein the service discovery response includes the information responsive to the second portion of the service discovery request;
generate a second service discovery response based on the query response; and
transmit the second service discovery response to the mobile station.

37. The apparatus of claim 36, wherein the service discovery response is encapsulated in a probe response frame and the second service discovery response is transmitted in a second frame that is not a probe response frame.

38. The apparatus of claim 32, wherein the service discovery request is an Access Network Query Protocol (ANQP) query.

39. A non-transitory processor-readable medium comprising instructions that, when executed by a processor, cause the processor to:
receive a probe request frame from a mobile station, wherein the probe request frame includes a service discovery request;
extract the service discovery request, wherein the service discovery request includes at least a first portion and a second portion, and wherein information responsive to the first portion of the service discovery request is stored at a cache of an access point;
generate a service discovery response based on the information responsive to the first portion of the service discovery request stored at the cache; and
transmit the service discovery response to the mobile station from the access point, the service discovery response responsive to at least the first portion of the service discovery request.

40. An apparatus comprising:
means for receiving a probe request frame from a mobile station at an access point, wherein the probe request frame includes a service discovery request;
means for extracting the service discovery request, wherein the service discovery request includes at least a first portion and a second portion, and wherein information responsive to the first portion of the service discovery request is stored at a cache of the access point;
means for generating a service discovery response based on the information responsive to the first portion of the service discovery request stored at the cache; and
means for transmitting the service discovery response to the mobile station from the access point, the service discovery response responsive to at least the first portion of the service discovery request.

* * * * *